(12) United States Patent
Ott et al.

(10) Patent No.: US 6,772,187 B1
(45) Date of Patent: Aug. 3, 2004

(54) PARALLEL GREATER THAN ANALYSIS METHOD AND APPARATUS

(75) Inventors: Michael L. Ott, Pleasenton, CA (US); Choon Ping Chng, Sunnyvale, CA (US); Tzungren Allen Tzeng, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 459 days.

(21) Appl. No.: 09/586,657

(22) Filed: Jun. 1, 2000

(51) Int. Cl.[7] .............................. G06F 7/50; G06F 3/00
(52) U.S. Cl. ........................................ 708/700; 708/160
(58) Field of Search ................................. 708/207, 671, 708/670, 490, 160, 505, 700; 340/146.2

(56) References Cited

U.S. PATENT DOCUMENTS

| | | | | |
|---|---|---|---|---|
| 4,441,165 A | * | 4/1984 | Coleman et al. ............ | 708/207 |
| 4,998,219 A | * | 3/1991 | Frauenglass ................ | 708/207 |
| 5,010,508 A | * | 4/1991 | Sit et al. ..................... | 708/505 |
| 5,289,156 A | * | 2/1994 | Ganmukhi ............... | 340/146.2 |
| 5,630,160 A | * | 5/1997 | Simpson et al. ............ | 708/490 |
| 5,905,428 A | * | 5/1999 | Bechade ................. | 340/146.2 |
| 6,018,756 A | * | 1/2000 | Wolrich et al. ............. | 708/505 |

* cited by examiner

Primary Examiner—Todd Ingberg
Assistant Examiner—Chat C Do
(74) Attorney, Agent, or Firm—Martine & Penilla, LLP

(57) ABSTRACT

Disclosed herein is an apparatus and method for determining if a first number is greater than or equal to a second number. By analyzing nibbles of a multi-bit number in parallel to determine for each nibble if the nibbles are unequal and if a first nibble is greater than a second nibble and thereafter logically determining which of the highest order nibbles, if any, are unequal to discover whether the first number is greater than the second number, or determining that all nibble pairs are equal and thus concluding that both numbers are equal. A digital logic circuit is preferably employed for such analysis.

5 Claims, 5 Drawing Sheets

NIBBLE LOGIC

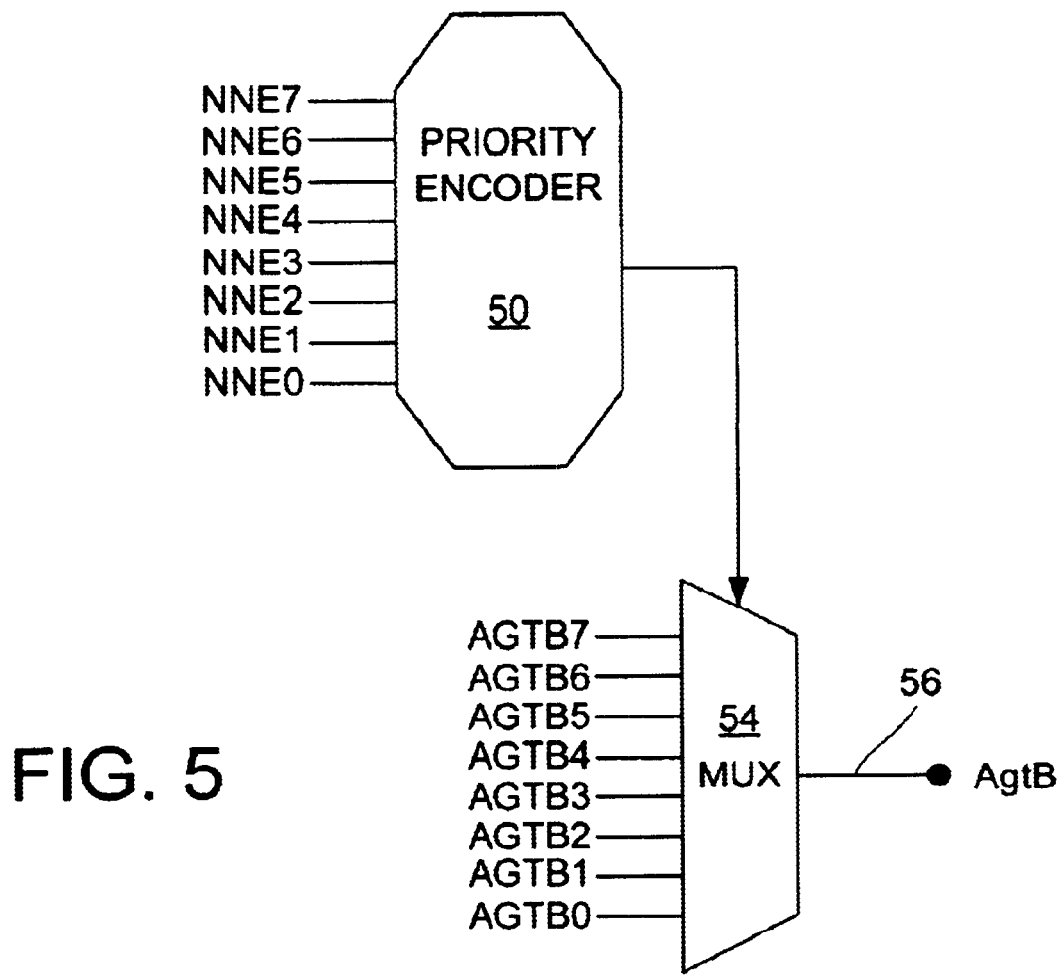
FIG. 5
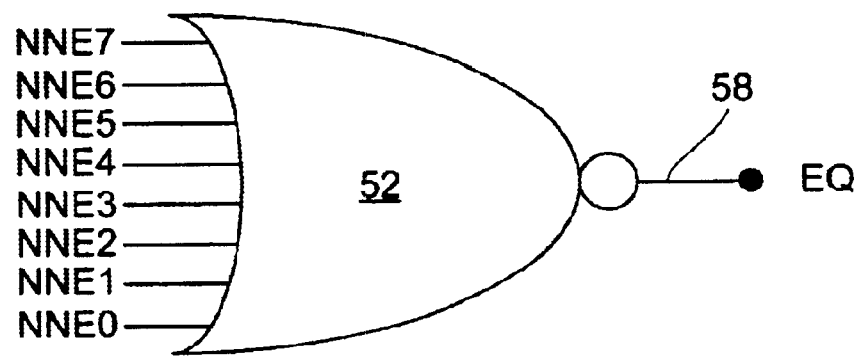

PARALLEL GREATER THAN ANALYSIS METHOD AND APPARATUS

BACKGROUND OF THE INVENTION

1. Field of the Invention

The present invention relates generally to digital logic circuitry. More particularly, the present invention relates to an apparatus and method for determining whether one number is greater than another number or whether they are equal.

2. The Prior Art

A frequent requirement of computer applications is to determine whether one number is greater than or equal to another number. Determining whether one number is greater than another number or equal to that number has been accomplished in the past by rudimentary methods. However, as microprocessors become faster and circuitry becomes more complex, a need exists to accomplish tasks such as this as quickly and efficiently as possible.

The conventional way of comparing two numbers to determine if the first is greater than the second is to subtract the second from the first, and then examine the result as depicted in FIG. 1. Essentially, a first number A and a second number B are input into a subtractor. An output Z (where Z=A−B) is obtained and an analyzer circuit determines whether A is greater than or equal to B based on whether Z is positive, negative, or zero. A truth table for such a method is provided at Table 1.

TABLE 1

| Z | RESULT |
|---|--------|
| + | A > B  |
| − | B > A  |
| 0 | A = B  |

The problem with a system such as that depicted in FIG. 1 and Table 1 is that subtractors are notoriously slow, and the problem is compounded as the numbers A and B become larger in value. Though this method obtains desired results, it is merely a brute force method, and thus, gives up speed and processor efficiency for its crude simplicity.

Another method of comparing two numbers is to use a TTL comparator. For example, a four-bit magnitude comparator such as the 5485/7485 series performs comparison of straight binary and straight BCD (8-4-2-1) codes. As described in The TTL Data Book, Texas Instruments, Inc., 1976, p. 7–57, "Three fully decoded decisions about 4-bit words (A, B) are made and are externally available at three outputs. These devices are fully expandable to any number of bits without external gates. Words of greater length may be compared by connecting comparators in cascade. The A>B, A<B, and A=B outputs of a stage handling less significant bits are connected to the corresponding A>B, A<B, and A=B inputs of the next stage handling more-significant bits. The stage handling the least-significant bits must have a high-level voltage applied to the A=B input in addition for the 'L85, low level voltages applied to the A>B and A<B inputs." While this method may be able to perform the task for words of greater length than 4 bits, unless the top set of 4 bits is the significant bit set, this method is slow because it analyzes each lower set of bits in order.

BRIEF DESCRIPTION OF THE INVENTION

To overcome these and other shortcomings of the prior art, disclosed herein is a system for determining whether a first number is greater than or equal to a second number. Generally, this system compares each bit pair simultaneously.

For each set of four bit pairs (or pairs of nibbles related to each number), the hardware determines: if any of the bit pairs within the nibble do not match (either a=1, b=0, or a=0, b=1) a "nibble not equal" or NNE output is indicated; for the highest mismatching bit pair within the nibble, whether the bit corresponding to the first number A is equal to one (1). Hence, if a nibble not equal is indicated, and A is equal to one, then logically A is greater than B, an outcome sought by this analysis. The results of the nibble's NNE are fed into a priority encoder. The results of each nibbles A greater than B determination are fed into a multiplexer. The output of the priority encoder selects which of the multiplexer inputs to output (the highest order A greater than B nibble result). The output of the multiplexer is the "greater than" result from the highest level (in the bit string) mismatched nibbles. This indicates whether the number A is greater than B. Additionally, the nibbles' NNEs can be NORed together to determine if the two numbers are equal. Thus, allowing for at least the determination of "A greater than B" (A>B), "A greater than or equal to B" (A≧B), "A equal to B" (A=B), "A less than B" (A<B), and "A less than or equal to B" (A≦B).

More particularly, Two bit string numbers may be divided into a plurality of nibbles (smaller bit strings) and each nibble analyzed to determine whether the contents of one number's nibble is greater than or equal to the comparable nibble in the other number. By utilizing such a scheme and employing digital logic devices, all nibbles of a plurality of bits may be compared simultaneously and system performance enhancements may be obtained thereby.

For instance, each bit within comparable nibbles of two numbers are input into nibble logic gate arrays simultaneously; the results indicating whether the nibble includes unequal values and whether one nibble input is greater than the other nibble input for each nibble pair. The results obtained thereby are simultaneously fed into a priority encoder, a multiplexer, and a NOR gate as follows. Values corresponding to whether the comparable nibbles are unequal are fed into the priority encoder to determine which highest level nibble pairs include unequal values. The priority encoder output then becomes the select line for the multiplexer. The multiplexer, then, has as its input the "greater than" nibble results for each nibble. The multiplexer output, thus, will indicate whether a first number is greater than a second number.

On the other hand, and simultaneously with the above, the same results from the nibble logic that are fed into the priority encoder are fed into the NOR gate. If all of the nibbles indicate that they are not unequal, then the resulting output for this element will indicate that the numbers are equal.

By utilizing digital logic and analyzing small (nibble) size pieces of the numbers, processing time is minimized and processing resources are optimized. As will be understood by the detailed disclosure below, although an application to 32 bit numbers having eight 4 bit nibbles is discussed, the same logic may be applied to any bit-length number having any logical number of bits within a nibble.

BRIEF DESCRIPTION OF THE DRAWING FIGURES

FIG. 5 is a schematic diagram of the result circuitry of the present invention.

DETAILED DESCRIPTION OF THE INVENTION

Persons of ordinary skill in the art will realize that the following description of the present invention is illustrative only and not in any way limiting. Other embodiments of the invention will readily suggest themselves to such skilled persons having the benefit of this disclosure.

Figure 1:
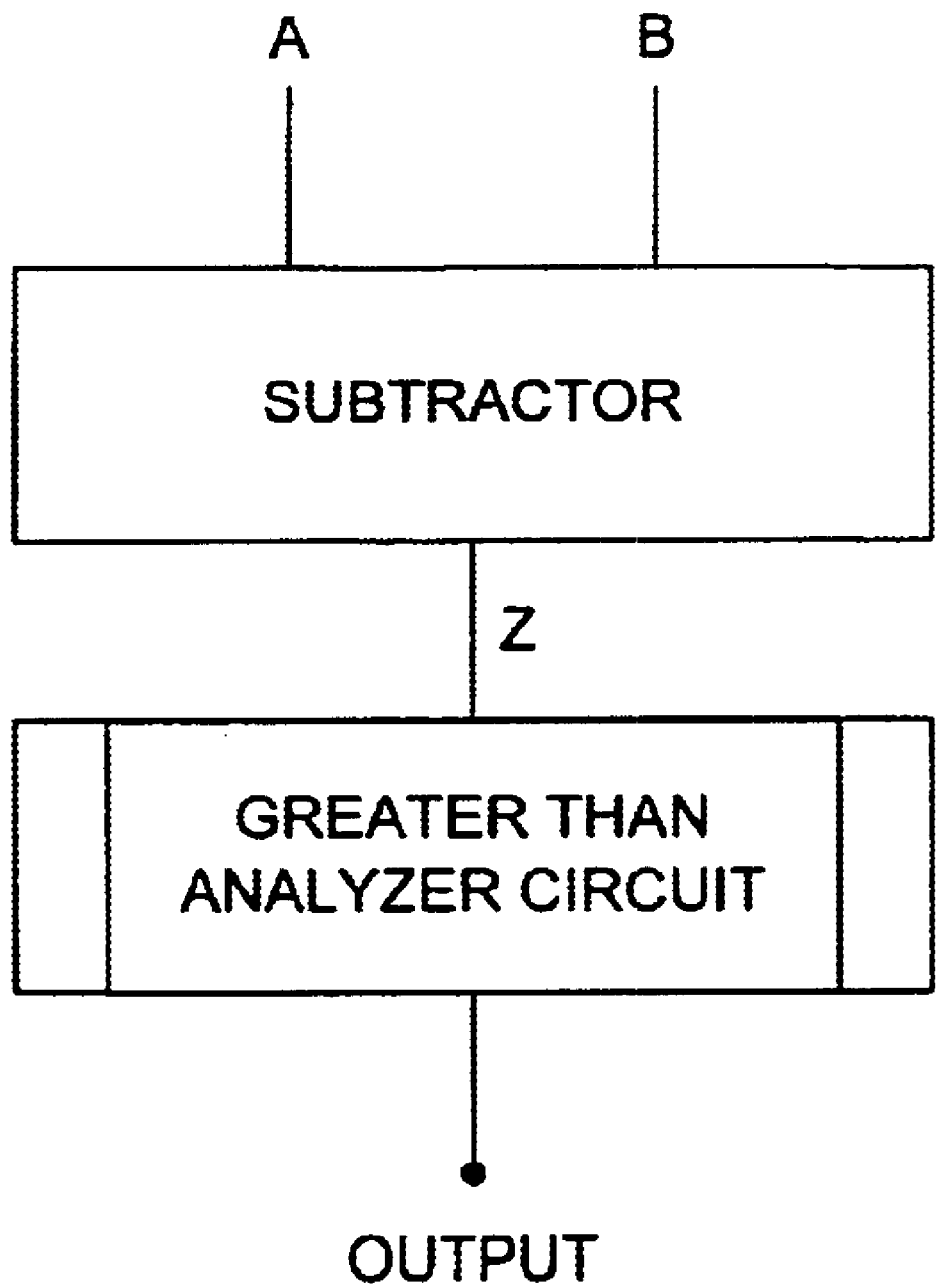
FIG. 1 is a schematic diagram of a prior art circuit
Figure 2:
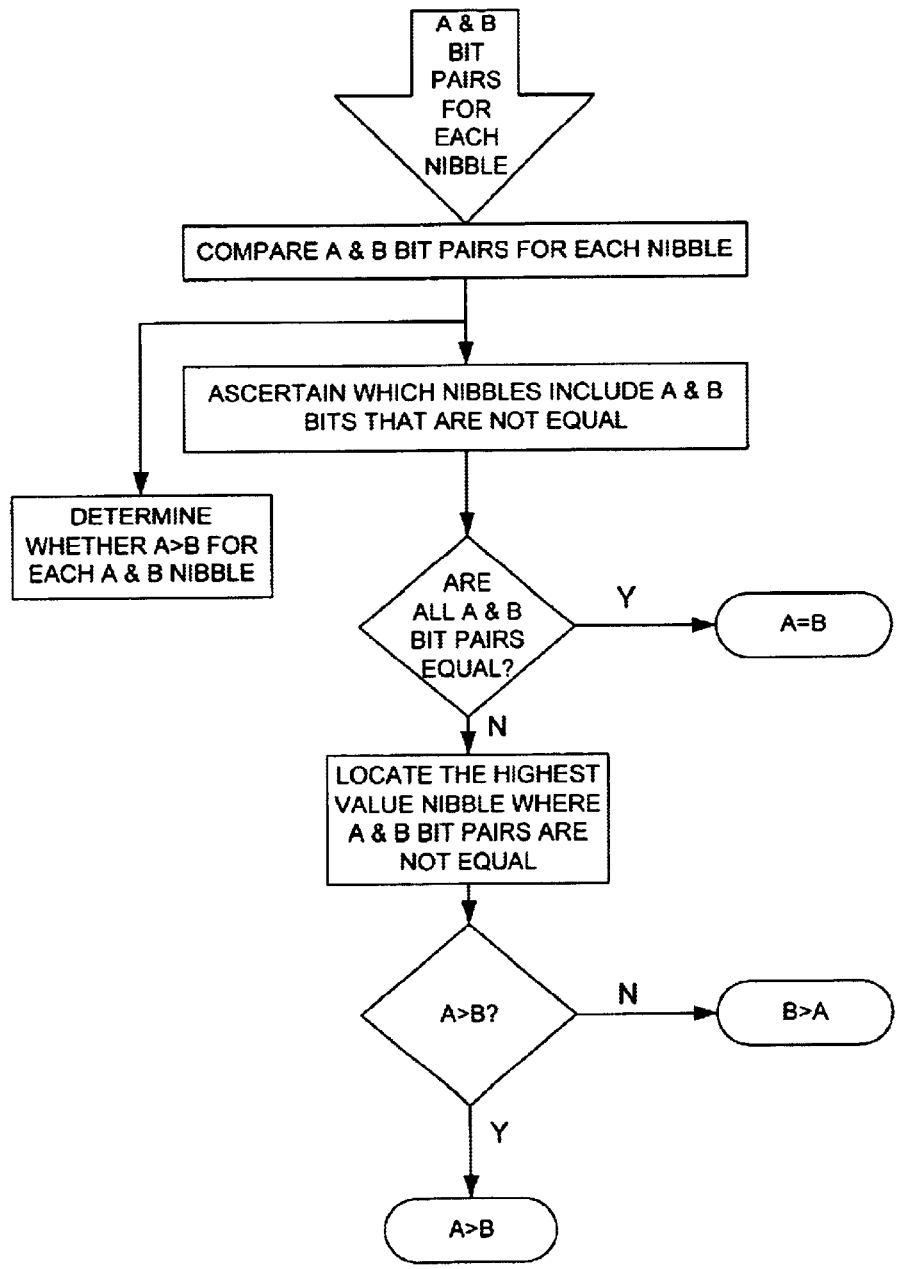
FIG. 2 is a flowchart of the process of the present invention.
Figure 3:
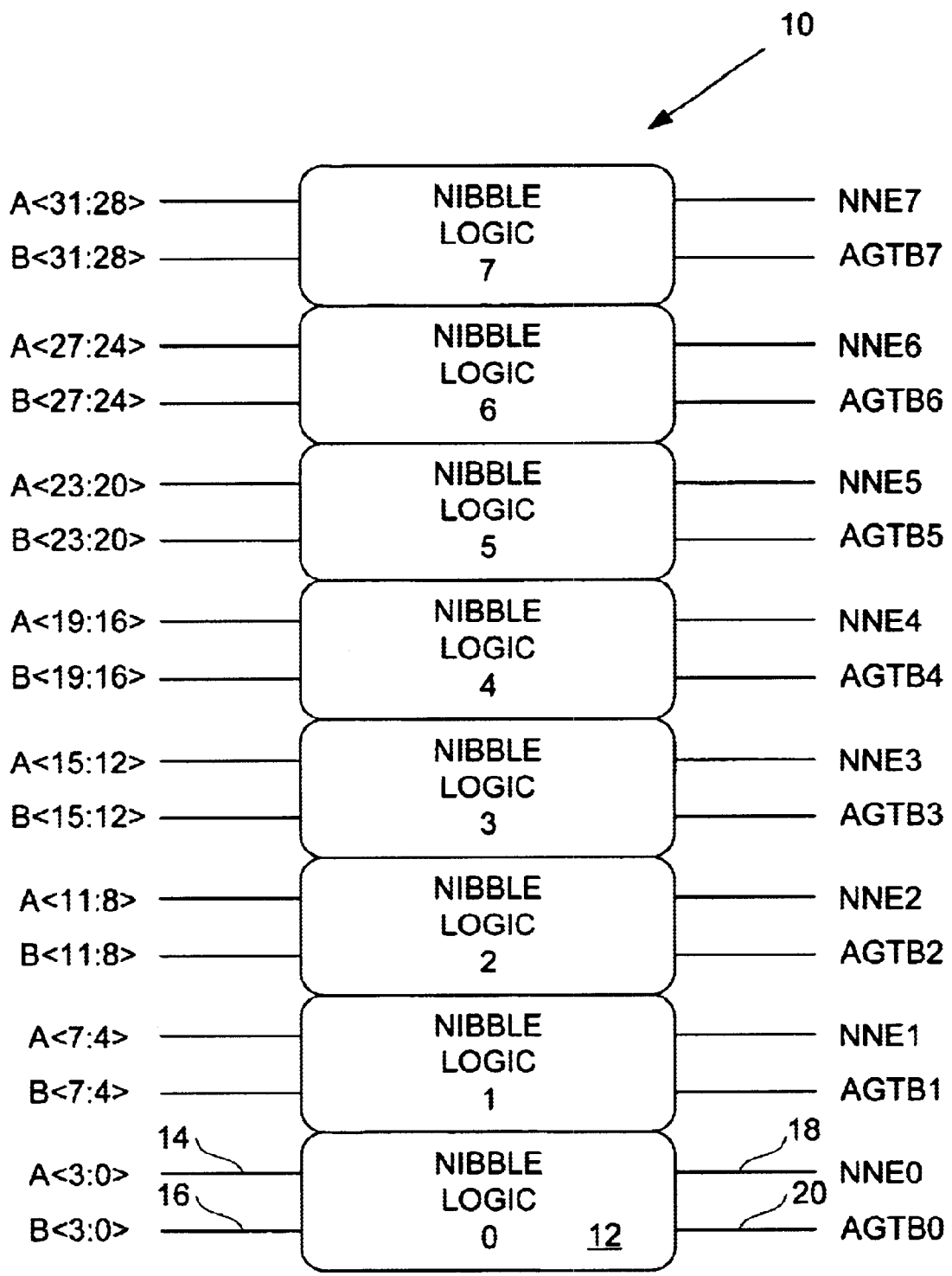
FIG. 3 is a schematic diagram of nibble logic circuitry of the present invention.

Referring to the drawing figures, wherein like numerals denote like parts throughout the various drawing figures, an overview in the form of a flowchart of this system is depicted generally in FIG. 2 while FIG. 3 is directed to the nibble logic 10 of the present invention. By way of example, it is assumed that the two numbers in question are 32 bit numbers, and that the nibbles to be considered are 4-bit nibbles. That is, the first 4 bits of number A (constituting nibble 0 for number A) input at 14 and the first 4 bits of number B (constituting nibble 0 for number B) input at 16 are presented to nibble logic 12 for nibbles 0. Hence, the nomenclature in FIG. 3, A<3:0> indicates bits 0, 1, 2, and 3 corresponding to number A's first nibble or nibble 0. Likewise, B<31:28> indicates bits 28, 29, 30, and 31 corresponding to number B's last nibble or nibble 7.

As shown in FIG. 3 then, each A and B pair of corresponding nibbles are presented to the inputs of their corresponding nibble logic. For instance, the first nibble pair A<3:0> and B<3:0> are presented to lines 14 and 16 respectively for nibble logic 0 identified as element 12. By way of certain digital logic to be described shortly, outputs NNE0 and AGTB0 are shown at reference numerals 18 and 20 respectively, where NNE0 corresponds to a "Nibble Not Equal" (NNE) value for nibble 0 and AGTB0 corresponds to an "A Greater Than B" (AGTB) value for nibble 0. That is, if NNE0 is 1, then nibble 0 for number A is not equal to nibble 0 for number B (i.e. at least one of bits 0, 1, 2, or 3 of A are not equal to the corresponding bits of B). However, if NNE0 is 0, then nibble 0 for number A is equal to nibble 0 for number B (or all bits 0, 1, 2, and 3 are equal for A and B).

On the other hand, if AGTB0 is 0, then the B nibble for nibble 0 is greater than the A nibble for nibble 0 or equal to nibble A. However, if AGTB0 is 1, then the A nibble for nibble 0 is greater than the B nibble for nibble 0. In a like fashion, nibbles 1 through 7 are analyzed in parallel.

Figure 4:
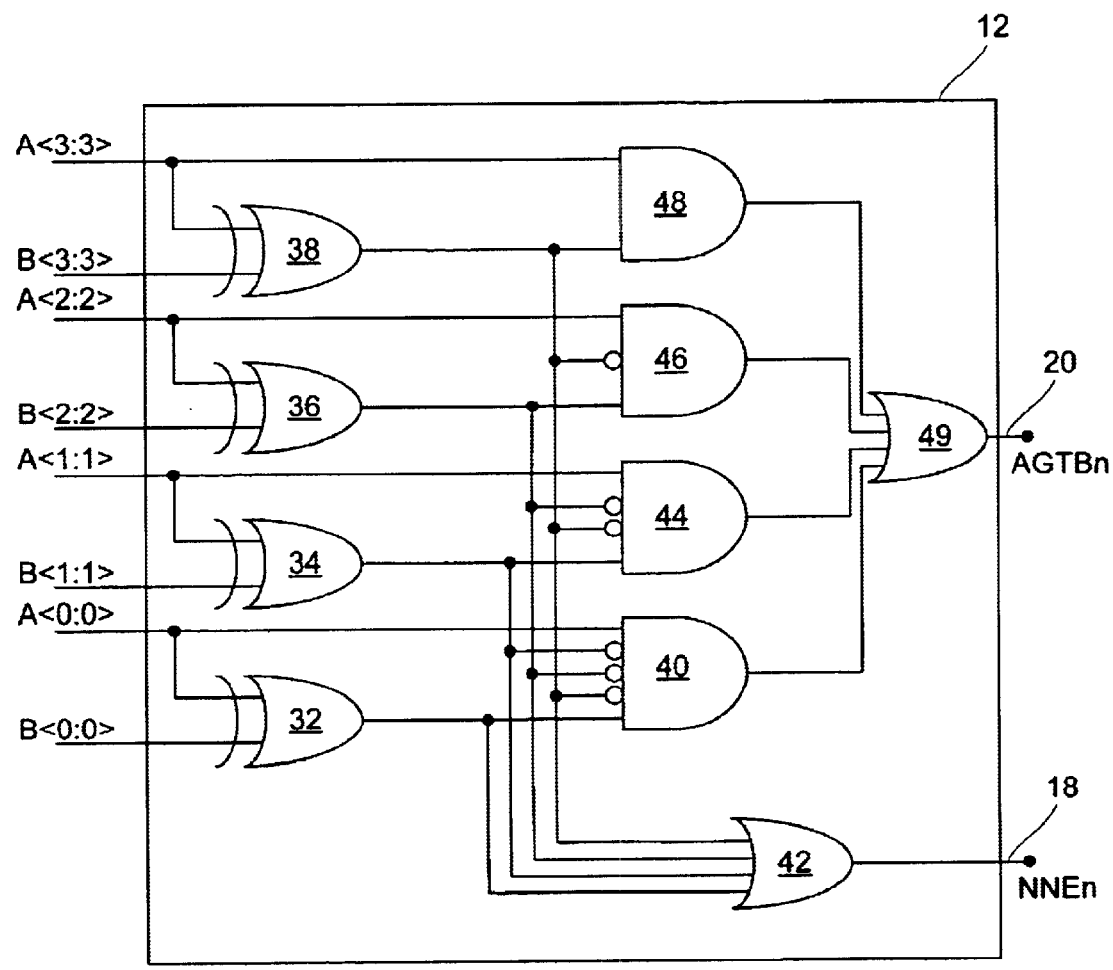
FIG. 4 is a schematic diagram of functional gate logic within the nibble logic circuitry of the present invention.

More particularly, by way of example, and referring now to FIG. 4, exemplary gate logic within the nibble logic 12 is depicted. On the input side, the first nibble, nibble 0 is again shown, in that the first four bits A<3:0> are individually input as A<0:0> for bit 0 of the A number, A<1:1> for bit 1 of the A number, A<2:2> for bit 2 of the A number, and A<3:3> for bit 3 of the A number. The corresponding B bits of this nibble are likewise depicted as inputs as shown in FIG. 4. Although this same gate logic scheme may be utilized for each nibble logic element 12 (i.e. nibble logic 1, nibble logic 2, and so forth), the inputs of FIG. 4 are limited to nibble 0 for example purposes only. Furthermore, as will be appreciated by those individuals skilled in the art informed by this disclosure, other circuit logic elements may be employed to obtain logically equivalent results without departing from the scope of this invention.

Thus, bit 0 of number B is presented to an input of Exclusive OR (XOR) gate 32 along with bit 0 of number A. However, bit 0 of number A is also presented to an input of AND gate 40 simultaneously. Similarly, bits 1, 2, and 3 of number B are presented to an input of XOR gates 34, 36, and 38 respectively. While bits 1, 2, and 3 of number A are presented to an input of XOR gates 34, 36, and 38 as well as AND gates 44, 46, and 48 respectively.

Additionally, the XOR gate outputs are presented to an input of all lower order AND gates and into OR gate 42. If all 4 bits are equal, the output from OR gate 42 will be 0 indicating that the A and B nibbles are equal. On the other hand, if any A/B bit pair is not equal, the output of OR gate 42 will be 1, indicating that the A and B nibbles are unequal. Thus, the output from OR gate 42 is defined at node 18 as NNE0 (or the Nibble Not Equal output for nibble 0).

The outputs of the AND gates 40, 44, 46, and 48 are presented to an input of OR gate 49. For the highest order unequal A/B bit pair, whether A is greater than B is determined by this portion of the circuit. It should be noted that each higher order XOR output result is cascaded down to each of the lower order AND gates and inverted as inputs to those AND gates, resulting in a circuit capable of discerning in a hierarchical fashion whether A is greater than B for the nibble under analysis.

Thus, circuit 12 handles two decisions at the same time. First, whether any A/B bit pair is unequal. Second, for the highest order unequal A/B bit pair within a nibble, whether A is greater than B.

Therefore, the output AGTB0 defined as node 20, indicates that A is greater than B for nibble 0 if the output is 1. On the other hand, if AGTB0=0, then either B is greater than A or A and B are equal. Thus, if NNE0=1 and AGTB0=0, then B is greater than A. The resultant logic is depicted in Table 2 as a truth table.

TABLE 2

| AGTBn | NNEn | RESULT |
| --- | --- | --- |
| 0 | 0 | A = B |
| 0 | 1 | B > A |
| 1 | 0 | cannot happen |
| 1 | 1 | A > B |

Referring now to FIG. 5, a result circuit is depicted. That circuit includes a priority encoder 50, a multiplexer 54, and a NOR gate 52. The NNEn values are presented to inputs of priority encoder 50 which selects the highest order NNEn to output to the select line of the multiplexer 50. That is, the priority encoder selects the highest NNE that is a 1 to output to the select line of the multiplexer. Thus, if NNE7=0, and NNE6=1, nibble 6 is selected for the multiplexer 54 select line.

Therefore, at multiplexer 54, where its inputs include all of the AGTBn outputs, given the select line determined by the priority encoder 50, this portion of the circuit can determine if A is greater than B as output at node 56 (AgtB). That is, if the output at node 56 is 1, A is greater than B, but if the output at node 56 is 0 B is greater than A or B is equal to A (depending on the NNEn values). In a case where A is equal to B, the priority encoder would have no output and thus no select would occur at multiplexer 54.

In the case where A is equal to B, NOR gate 52 is implicated. Just as with priority encoder 50, all NNEn values are presented to inputs of NOR gate 52 as well. However, in this circuitry, if all NNEn's are 0 (indicating that all of the nibbles are not unequal, and thus equal), then the output at node 58, EQ, will be 1. Otherwise, A and B are not equal and the output is 0. This result is relevant in the case where AgtB is 0 as well. That is, if EQ=0 and AgtB=0, then B is greater than A. Resulting output logic is indicated in Table 3 below in truth table format.

TABLE 3

| AgtB | EQ | RESULT |
|------|----|--------|
| 0 | 1 | A = B |
| 1 | 0 | A > B |
| 0 | 0 | B > A |
| 1 | 1 | cannot happen |

In use and operation, given that A and B are defined as follows in Table 4.

TABLE 4

| | NIBBLE 7 | | | | NIBBLE 6 | | | | NIBBLE 5 | | | | NIBBLE 4 | | | | NIBBLE 3 | | | |
|---|---|---|---|---|---|---|---|---|---|---|---|---|---|---|---|---|---|---|---|---|
| | 31 | 30 | 29 | 28 | 27 | 26 | 25 | 24 | 23 | 22 | 21 | 20 | 19 | 18 | 17 | 16 | 15 | 14 | 13 | 12 |
| A | 0 | 1 | 0 | 0 | 1 | 1 | 1 | 0 | 0 | 1 | 0 | 1 | 0 | 1 | 1 | 1 | 1 | 0 | 0 | 1 |
| B | 0 | 0 | 1 | 0 | 1 | 1 | 1 | 1 | 0 | 1 | 0 | 1 | 1 | 1 | 0 | 0 | 1 | 0 | 0 | 0 |

| | NIBBLE 2 | | | | NIBBLE 1 | | | | NIBBLE 0 | | | |
|---|---|---|---|---|---|---|---|---|---|---|---|---|
| | 11 | 10 | 9 | 8 | 7 | 6 | 5 | 4 | 3 | 2 | 1 | 0 |
| A | 0 | 0 | 0 | 0 | 0 | 1 | 1 | 0 | 1 | 0 | 1 | 0 |
| B | 0 | 0 | 1 | 1 | 0 | 1 | 1 | 0 | 0 | 0 | 0 | 1 |

The following Table 5 indicates the resultant AGTBn and NNEn outputs from nibble logic circuit 10.

TABLE 5

| NIBBLE | A INPUT | B INPUT | NNE OUTPUT | AGTB OUTPUT |
|--------|---------|---------|------------|-------------|
| 0 | 1010 | 0001 | 1 | 1 |
| 1 | 0110 | 0110 | 0 | 0 |
| 2 | 0000 | 0011 | 1 | 0 |
| 3 | 1001 | 1000 | 1 | 1 |
| 4 | 0111 | 1100 | 1 | 0 |
| 5 | 0101 | 0101 | 0 | 0 |
| 6 | 1110 | 1111 | 1 | 1 |
| 7 | 0100 | 0010 | 1 | 1 |

Thus, the NNEn values would be presented to the inputs of the priority encoder 50 resulting in 7 corresponding to NNE7 as the select line of the multiplexer 54. AGTB7 would then thus be output at node 56 resulting in a 1 output or A>B. Though not needed in this instance, because one of the NNE values is 1, namely NNE7, the output at node 58 would be 0 as expected because A and B are not equal.

Significantly, because nibble logic circuits 12 are performed in parallel, the total amount of delay is minimized to the output. Furthermore, none of the individual functions performed by any given circuit element is complex, resulting in minimization of processor resources and time.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A parallel greater-than analyzer circuit, comprising in combination:

an array of nibble logic units ordered by bit significance, each including a first nibble input and a second nibble input, a first output being active if said first nibble input is greater than said second nibble input, and a second output being active if said first and second nibble inputs are unequal;

a priority encoder having a plurality of inputs, each said input operatively coupled to a different one of said nibble logic array second outputs in order of bit significance, said priority encoder including a priority encoder output;

a multiplexer having a plurality of inputs, each said input operatively coupled to a different one of said nibble logic array first outputs, said multiplexer having at least one select line coupled to said priority encoder output, wherein said multiplexer includes an output being active if the first nibble inputs are greater than the second nibble inputs; and at least one circuit logic element having a plurality of inputs, each said input operatively coupled to a different one of said nibble logic array second outputs, said circuit logic element having an output being active if the first nibble inputs are equal to the second nibble inputs.

2. The parallel greater-than analyzer circuit of claim 1 further comprising a NOR gate as the said at least one circuit logic element.

3. The parallel greater-than analyzer circuit of claim 2 further comprising a plurality of interconnected gate logic elements included within each said nibble logic unit.

4. The parallel greater-than analyzer circuit of claim 3 wherein each nibble input includes four bits of a 32-bit number.

5. The parallel greater-than analyzer circuit of claim 4 wherein each nibble input includes four bits of a 64-bit number.

\* \* \* \* \*